United States Patent [19]

Miyake et al.

[11] Patent Number: 4,744,373
[45] Date of Patent: May 17, 1988

[54] LEAF PICKING APPARATUS FOR TOBACCO PLANTS

[75] Inventors: Yasuhiko Miyake, Oyama; Katsuyuki Manzawa, Tochigi, both of Japan

[73] Assignee: Japan Tobacco, Inc., Tokyo, Japan

[21] Appl. No.: 836,350

[22] Filed: Mar. 5, 1986

[30] Foreign Application Priority Data

Mar. 6, 1985 [JP] Japan ................................. 60-42889

[51] Int. Cl.⁴ .............................................. A10D 1/00
[52] U.S. Cl. ................................................. 130/30 R
[58] Field of Search ................. 131/324, 327; 56/27.5; 130/30 R

[56] References Cited

U.S. PATENT DOCUMENTS

| | | | |
|---|---|---|---|
| 4,292,982 | 10/1981 | Butcher | 130/30 R |
| 4,350,172 | 9/1982 | Guthrie | 130/30 R |
| 4,353,377 | 10/1982 | Seymour | 130/30 R |
| 4,353,378 | 10/1982 | Seymour | 130/30 R |
| 4,478,227 | 10/1984 | McKinney et al. | 130/30 R |
| 4,498,484 | 2/1985 | Gilbert | 130/30 R |

FOREIGN PATENT DOCUMENTS 51-1355 1/1976 Japan .

Primary Examiner—V. Millin
Attorney, Agent, or Firm—Nixon & Vanderhye

[57] ABSTRACT

A leaf picking apparatus according to the present invention comprises a leaf picking disk of elastic material adapted to rotate in one direction. The disk has an opening in the center and a plurality of elastically deformable tongues spaced circumferentially and extending radially inward from the peripheral edge of the opening. Each tongue of the disk is fitted with a metallic plate piece for keeping the tongue curved to one side of the disk and twisted in the direction opposite to the rotating direction of the disk. The plate pieces project from the distal ends of their corresponding tongues. A cylindrical leaf picking tip is fixed to the projecting end of each plate piece. The tip has an axis across the longitudinal direction of its corresponding tongue, and its leading end, as viewed in the rotating direction, is located outside its trailing end with respect to the radial direction of the disk.

14 Claims, 4 Drawing Sheets

LEAF PICKING APPARATUS FOR TOBACCO PLANTS

BACKGROUND OF THE INVENTION

The present invention relates to a leaf picking apparatus for picking off tobacco leaves from reaped and dried tobacco plants.

In general, tobacco plants cultivated in tobacco fields are reaped from their stalks for harvesting, and the reaped plants are dried entire to a predetermined degree. After the drying, the plants are reduced to stalks and leaves. Conventionally, this reduction or leaf picking work is accomplished manually, requiring much time and labor. This greatly impedes an improvement of the efficiency of production of tobacco leaves.

Accordingly, there is a demand for leaf picking apparatuses which can mechanically perform the leaf picking work to save labor. Some of these apparatuses are already on the market. They include a picking apparatus disclosed in Japanese Utility Model Disclosure No. 51-1355. This conventional apparatus comprises a fixed cutting member in the form of a hollow, tapered tube with a plurality of axially extending slits arranged circumferentially at predetermined intervals on its outer peripheral surface, and a plurality of rotating cutting blade rotating in sliding contact with the outer peripheral surface of the fixed cutting tube. In this picking apparatus, a tobacco plant, rotating about the axis of its stalk, is gradually inserted into the fixed cutting tube from the front end side thereof, with the stalk top forward. When the stem of a tobacco leaf enters one of the slits of the fixed cutting tube, it is cut by the rotating blade.

In the leaf picking apparatus described above, however, it is hard for the stems of tobacco leaves to securely enter the slits of the fixed tube. Therefore, many of the leaves may run against the fixed cutting tube and rotating blade without being cut thereby from their stems. Thus, the leaf picking efficiency of the apparatus is very low. Moreover, the uncut leaves hit by the rotating blade are seriously damaged, constituting a substantial hindrance to the performance in the next process.

Even though the stems of tobacco leaves can manage to enter the slits of the fixed cutting tube, in the aforesaid prior art apparatus, the leaves are cut at different points by the fixed cutting tube and rotating blade, due to varied postures of the leaves. Thus, the leaves are cut at various regions, some at the stems and others at the blades. In conclusion, they cannot be obtained entire.

SUMMARY OF THE INVENTION

The object of the present invention is to provide a leaf picking apparatus for tobacco plants, ensuring higher leaf picking efficiency and capable of picking off tobacco leaves entire and without damage.

The above is achieved by a leaf picking apparatus for tobacco plants according to the present invention, which comprises a leaf picking disk having an axis of rotation and supported for rotation, the disk having a center opening concentric with the axis and a plurality of elastically deformable tongues spaced circumferentially and extending radially inward from the peripheral edge of the opening, drive means for rotating the leaf picking disk in one rotating direction around the axis of rotation, forming means for keeping the tongues of the leaf picking disk curved to one side of the disk so that the inside end portions of the tongues spread radially outward, a plurality of leaf picking elements projecting from the distal ends of the tongues and adapted to rotate, in contact with the outer peripheral surface of stalks of the tobacco plants, as the leaf picking disk rotates when the plants are passed through the disk from the one side thereof with the base of the stalk of each plant forward, and transport means for transporting the tobacco plants in one direction along the axis of rotation.

According to the leaf picking apparatus of the invention, when one of the tobacco plants is passed through the rotating leaf picking disk with the base of its stalk forward, the leaf picking elements of the tongues of the disk rotate in contact with the outer peripheral surface of the stalk without regard to the diameter or surface condition of the stalk, aided by the resilience of the tongues. As the plant is advanced, the picking elements of the tongues engage the proximal ends of the stems of tobacco leaves on the stalk or penetrate spaces between the stalk and the proximal end portions of the stems to be caught thereby. Thereupon, the tobacco leaves are picked off from the stalk at the proximal end portions of their stems. Since this leaf picking action is effected before the blades of the tobacco leaves engage the leaf picking disk, it cannot damage the leaves. Moreover, the picking action of the leaf picking elements is securely applied to the proximal ends of the stems of the leaves or regions near the ends. Thus, the tobacco leaves can be picked off entire.

As the leaf picking disk rotates, furthermore, the leaf picking elements of the tongues securely engage or catch the proximal ends of the stems of the tobacco leaves or regions near the proximal ends, without regard to the insertions of the leaves on stalk. Thus, the leaf picking action covers all the leaves of the tobacco plant, greatly improving the leaf picking efficiency.

BRIEF DESCRIPTION OF THE DRAWINGS

The above and other objects, features and advantages of the present invention will be apparent in the following detailed description of illustrative embodiments thereof which is to be read in connection with the accompanying drawings, in which.

DETAILED DESCRIPTION OF THE PREFERRED EMBODIMENTS

Figure 1:
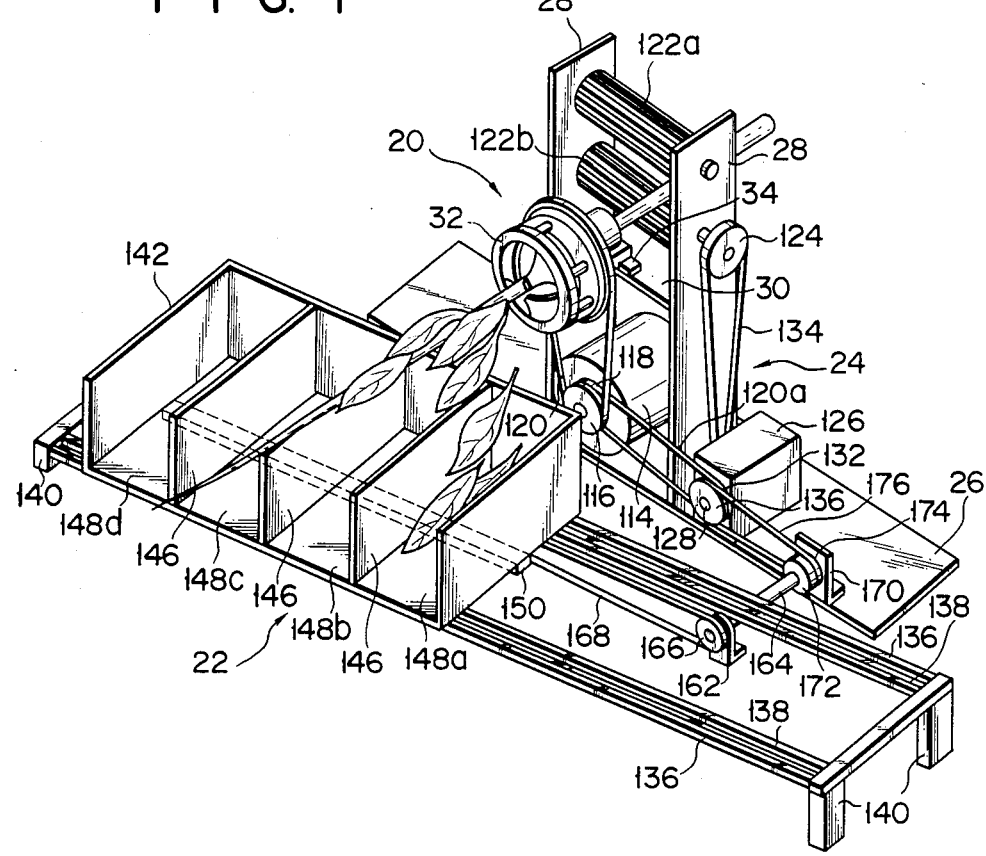
FIG. 1 is a perspective view schematically showing a tobacco leaf picking/sorting system according to the present invention.

Referring now to FIG. 1, there is shown a leaf picking/sorting system for tobacco plants. This system is mainly composed of tobacco leaf picking apparatus 20 and tobacco leaf sorting/collecting apparatus 22. Picking apparatus 20 will first be described in detail.

Apparatus 20 comprises support frame 24 which includes elongate base plate 26 and a pair of upright plates 28 standing on plate 26. Plates 28 extend parallel to each other, spaced in the longitudinal direction of plate 26. They are connected to coupling plate 30 which extends parallel to the base plate.

Leaf picking unit 32 (shown in detail in FIG. 3) is mounted on coupling plate 30. It includes hollow guide cylinder 36 which is fixed to plate 30 by means of holder 34. Cylinder 36 protrudes forward or to the right of FIG. 3 from support frame 24. Pulley 40 is rotatably mounted on the projecting end portion of cylinder 36 by means of a pair of bearings 38. First oil seal 42 is disposed between the frame-side end portion of pulley 40 and cylinder 36.

Figure 3:
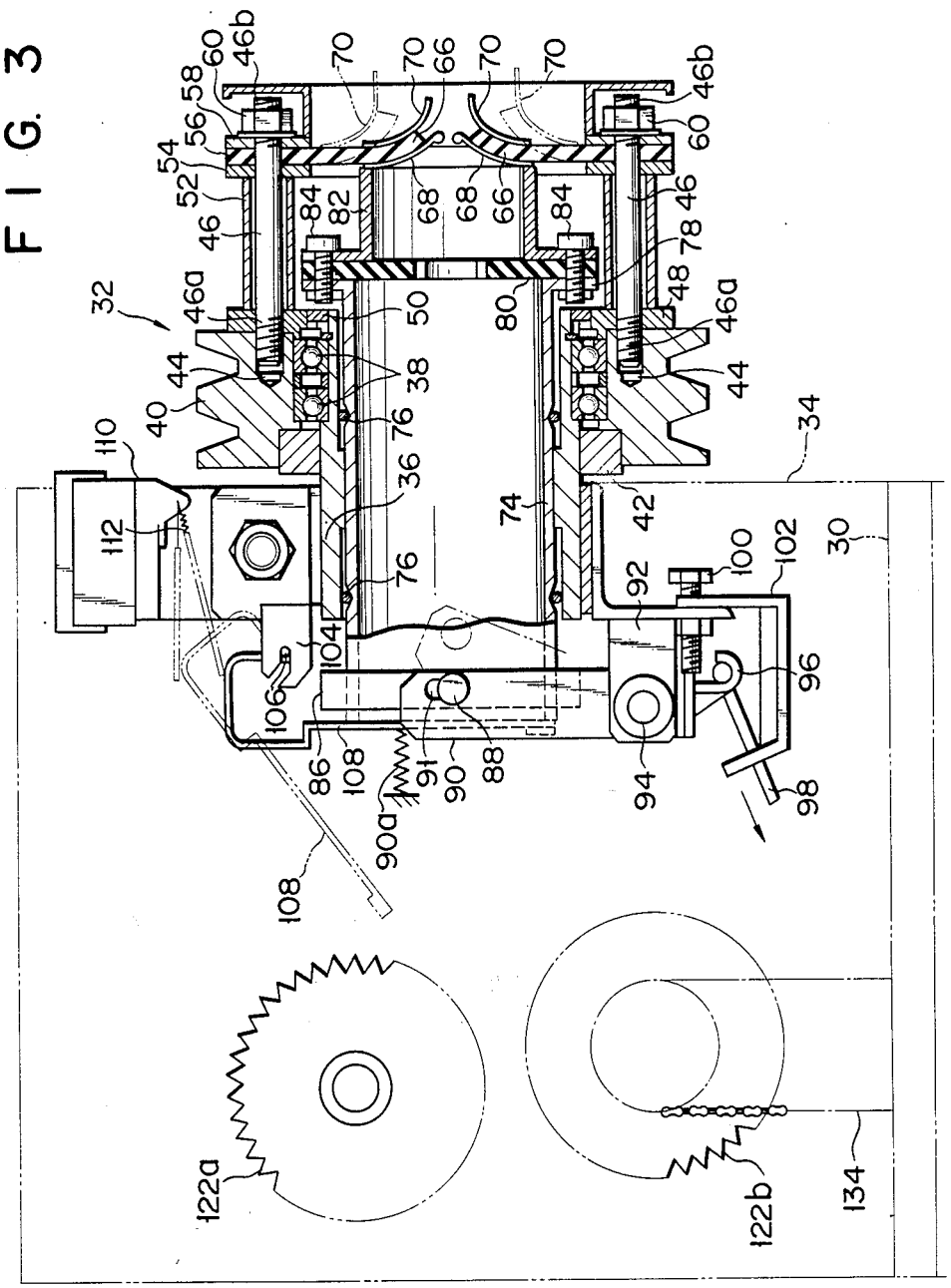
FIG. 3 is a sectional view of a leaf picking unit used in the system of FIG. 1.

Tapped holes 44, e.g., six in number, are formed in end face 40a of pulley 40 remoter from support frame 24, arranged at regular intervals in the circumferential direction of pulley 40. Screw portions 46a formed on the respective proximal end portions of support rods 46 are screwed individually in holes 44. Rods 46 extend parallel to one another. Also, screw portion 46b is formed on the distal end portion of each rod 46. Rods 46 are fitted with snap ring 48 which abuts against the end face 40a of pulley 40 and serves as a stopper for bearings 38. Ring 48 is previously formed with holes which are arranged circumferentially at regular intervals and through which support rods 46 are passed individually. Second oil seal 50 is disposed between ring 48 and guide cylinder 36. Fitting ring 54, leaf picking disk 56, and hood ring 58 are fitted successively on the distal end portions of rods 46 with the aid of spacer tubes 52 which surround their corresponding rods 46. Members 54, 56 and 58 are fixed to support rods 46 by means of nuts 60 screwed individually on screw portions 46b of rods 46. As shown in FIG. 3, hood ring 58 is shaped so as to cover nuts 60.

Figure 4:
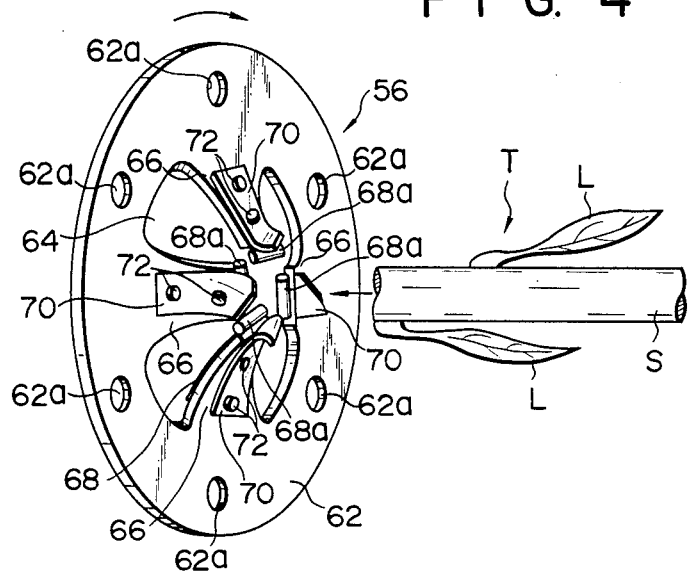
FIG. 4 is a perspective view of a leaf picking disk incorporated in the unit of FIG. 3.

FIG. 4 shows leaf picking disk 56 in detail. Disk 56 includes flexible base 62 made of polyurethane rubber, natural rubber, duck inserted rubber belt or other elastic material. Base 62 is formed, on its peripheral edge portion, with holes 62a which are arranged circumferentially at regular intervals and through which support rods 46 are passed individually. Opening 64 of a predetermined size is formed in the center of base 62. Tongues 66, e.g., four in number, protrude integrally from the peripheral edge of opening 64 toward the center of flexible base 62, arranged circumferentially at regular intervals. Metallic main plate pieces 68 are attached individually to the rear faces or pulley-side faces of tongues 66, extending in the longitudinal direction of the tongues. Pieces 68 have a shape such that tongues 66 are curved so as to project forward from flexible base 62, and are twisted in the direction opposite to the rotating direction (indicated by an arrow in FIG. 4) of picking disk 56, if necessary. Cylindrical leaf picking tip 68a is attached to the extreme end of each main plate piece 68 so as to project from its corresponding tongue 66. Tips 68a are arranged so that their axes cross the longitudinal direction of their corresponding tongues 66, and that their leading ends, as viewed in the rotating direction of disk 56, are located outside their trailing ends with respect to the radial direction of the disk. Also, metallic auxiliary plate pieces 70 are attached individually to the front faces of tongues 66. Pieces 70 are shaped so as to extend along the surfaces of tongues 66 which are curved and twisted by pieces 68. Thus, the main and auxiliary plate pieces resemble in shape. The tip ends of pieces 70 project longer from tongues 66 and are more greatly curved outward in the radial direction of flexible base 62 than those of pieces 68. In FIG. 4, numeral 72 designates fixing screws used to fix main and auxiliary plate pieces 68 and 70 to their corresponding tongues 66.

Referring again to FIG. 3, hollow moving cylinder 74 is inserted in guide cylinder 36 for axial movement with the aid of a pair of bearings 76. Bearings 76, which are spaced in the axial direction of cylinder 74, are each formed of a number of steel balls rotatably held on the outer peripheral surface of cylinder 74 and in rolling contact with the inner peripheral surface of guide cylinder 36. The front end of moving cylinder 74 on the side of leaf picking disk 56 projects from cylinder 36, and is formed integrally with flange 78. Pushing cylinder 82 is attached to flange 78 by means of fixing screws 84, with the aid of elastic ring 80 made of rubber or other elastic material. The inner diameter of ring 80 is slightly smaller than the outer diameter of the stalk of tobacco plant but a plurality of slits are provided in the inner face of ring 80, so that the stalk can pass through ring 80. Cylinder 82 is smaller in diameter than moving cylinder 74. In the state shown in FIG. 3, the front end of cylinder 82 abuts against tongues 66 of disk 56.

The rear end of moving cylinder 74, like the front end thereof, projects from guide cylinder 36. Stopper ring 86, equal in outside diameter to cylinder 36, is mounted on the outer peripheral surface of the rear end portion of cylinder 74, spaced from the rear end of cylinder 36. From ring 86 protrudes pin 88 which is connected with one end of link lever 90. Pin 88 projects to the outside through slit 91 which is formed at one end of lever 90 and extends in the longitudinal director of lever 90. The lower end portion of lever 90 is rotatably mounted, by means of pin 94, on bracket 92 which is fixed to holder 34. Hook 96 is formed on the lower end of lever 90. It is coupled with one end of wire 98, the other end of which is connected to a pedal (not shown). Guide 102 for wire 98 is mounted on bracket 92 by means of fixing screw 100. Return spring 90a is anchored between lever 90 and fixed wall 34a constituting part of holder 34.

Bracket 104 is attached to the top side of the outer peripheral surface of the rear end portion of guide cylinder 36. Detecting member 108 is rockably mounted on bracket 104 by means of shaft 106. Member 108 is formed by bending an elongate plate. Normally, it is suspended from shaft 106 by gravity so as to close at least the center of the rear end opening of moving cylinder 74. Also, limit switch 110 is mounted on the upper portion of bracket 104. It is provided with switch lever 112 one end of which is rotatably supported by switch 110. The other end of lever 112 engages detecting member 108 from above. When member 108 is rocked upward to a position indicated by two-dot chain line in FIG. 3 so that lever 112 is also rocked upward following the member, switch 110 is turned on, for example.

Turning again to FIG. 1, electric motor 114 is disposed on base plate 26 of support frame 24, located between upright plates 28. Outside and inside pulleys 116 and 118 are mounted on the output shaft of motor 114. Belt 120 is stretched between pulley 40 of leaf picking unit 32 and either of pulleys 116 and 118, e.g., outside pulley 116. Thus, the rotational force of motor 114 is transmitted to pulley 40 by belt 120. Further, a pair of toothed rollers 122a and 122b are rotatably supported between plates 28, located above coupling plate 30. Rollers 122a and 122b are arranged parallel to each other, spaced vertically at a predetermined distance just wide enough to allow stalks of tobacco plants to be bitten and pass between the rollers. The rotating shaft of lower roller 122b projects from one of upright plates 28. Sprocket 124 is mounted on the projecting end of the shaft of roller 122b. Like pulley 40, sprocket 124 is rotated by the rotatinal force of motor 114. That is, gearbox 126 is disposed on base plate 26, located beside the upright plate furnished with sprocket 124. From gearbox 126 protrudes input/output shaft 128 which extends parallel to the output shaft of motor 114. Outside and inside pulleys 130 and 132 are mounted on shaft 128. Belt 120a is stretched between inside pulley 132 and inside pulley 118 of motor 114. An output shaft (not shown), which is connected to shaft 128 by means of a transmission mechanism (not shown) inside gearbox 126, protrudes from that side face of gearbox 126 opposed to upright plate 28. A sprocket (not shown) is mounted on this output shaft. Chain 134 is stretched between this sprocket and sprocket 124, whereby the driving force of motor 114 is transmitted to toothed roller 122b via input/output shaft 128, transmission mechanism, output shaft (not shown), sprocket (not shown), and chain 134.

As shown in FIG. 1, sorting/collecting apparatus 22 is disposed in front of leaf picking apparatus 20. Apparatus 22 will now be described in detail. It is provided with a pair of rails 136 which extend parallel to each other in a direction perpendicular to the axis of leaf picking unit 32, and are slanted upward at one end side. Guide groove 138 is formed in the top surface of each rail 136, extending in the longitudinal direction of the rail. Each end of each rail 136 is supported by support leg 140. Those two legs 140 on the one end side of rails 136 are longer than those on the other end side.

Figure 2:
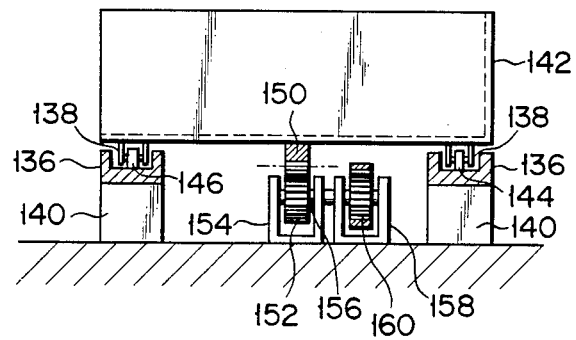
FIG. 2 is a partial sectional view of a sorting/collecting apparatus used in the system of FIG. 1.

Rails 136 carry thereon collecting vessel 142 which is movable along the rails. As shown in FIG. 2, vessel 142 is fitted, on its bottom face, with a plurality of wheels 144 which run within guide grooves 138 of rails 136. The vessel is in the form of a box elongated in the longitudinal direction of the rails. The inside of vessel 142 is divided at predetermined intervals in the longitudinal direction of rails 136 by several partition walls 146. In the embodiment shown in FIG. 1, vessel 142 is internally divided into four compartments 148a, 148b, 148c and 148d. The number of compartments may, however, be varied as required. Since rails 136 are slanted, collecting vessel 142 normally descends on rails 136 by gravity and abuts against a stopper (not shown) to be held in the position shown in FIG. 1. When vessel 142 is retained by the stopper, compartment 148a in the uppermost position of vessel 142 is located right under leaf picking unit 32.

Rack 150 is attached the center of the bottom face of collecting vessel 42, extending parallel to rails 136. It is in mesh with pinion 152, as shown in FIG. 2. Pinion 152 is rotatably supported on bearing 154 between and below rails 136 by rotating shaft 156. Another bearing 158 is disposed beside bearing 154, having shaft 156 in common. Sprocket 160 is mounted on bearing 158 by means of shaft 156. Bracket 162 is disposed at a predetermined distance from bearing 158, the former being nearer to the one end side of rails 136 than the latter is. One end portion of rotating shaft 164 is rotatably supported by bracket 162. Sprocket 166 is mounted on one end of shaft 164, and chain 168 is stretched between sprocket 166 and sprocket 160 of bearing 158.

The other end side of rotating shaft 164 extends toward base plate 26 of support frame 24. The other end of shaft 164 is releasably connected, by means of electromagnetic clutch 172, to a rotating shaft (not shown) which is rotatably supported by bracket 170 on plate 26. Pulley 174 is mounted on the shaft of bracket 170, and belt 176 is stretched between pulley 174 and outside pulley 130 of gearbox 126. The operation of clutch 172 is controlled by means of limit switch 110 (see FIG. 3).

The tobacco leaf picking/sorting system with the aforementioned construction will now be described.

First, when electric motor 114 is started, its rotational force is transmitted to pulley 40 of leaf picking unit 32 via pully 116 and belt 120, so that pulley 40 or leaf picking disk 56 is rotated. At the same time, the driving force of motor 114 is transmitted to toothed roller 122b through belt 120a, gearbox 126, and chain 134, thereby rotating roller 122b. Also, the rotatory force is delivered from gearbox 126 to pulley 174 to rotate the same. In this case, electromagnetic clutch 172 does not connect rotating shaft 164 and the shaft of pulley 174, so that shaft 164 cannot be rotated.

In the aforesaid state, if the pedal is worked to pull wire 98 as indicated by an arrow in FIG. 3, link lever 90 rocks around pin 94 against the force of return spring 90a. As a result, moving cylinder 74 moves forward or toward leaf picking disk 56. It continues to do so until stopper ring 86 abuts against the rear end of guide cylinder 36. As cylinder 76 advances in this manner, pushing cylinder 82 coupled to the front end of cylinder 74 also moves in the same direction. The front end of cylinder 82 pushes tongues 66 of disk 56 forward so that the tongues undergo a substantial elastic deformation. Thus, a wide opening is formed in the center of disk 56, indicating the readiness of the system for a leaf picking operation for dried tobacco plants.

In this state, tobacco plant is manually fed into leaf picking unit 32 through the center opening of leaf picking disk 56. In doing this, tobacco plant T must be inserted into the opening with the base of its stalk S forward. After plant T is inserted in this manner, the pedal is released, so that link lever 90 is restored to its original position by the force of return spring 90a. Following the returning action of lever 90, moving cylinder 74 or pushing cylinder 82 is also restored to its original position shown in FIG. 3. Accordingly, tongues 66 of disk 56 are urged, by their own resilience, to return to the position indicated by full line in FIG. 3. By this time, however, tobacco plant T has already been passed through the center opening of disk 56, so that leaf picking tips 68a of main plate pieces 68 attached to tongues 66 abut against the outer peripheral surface of plant T. Owing to the twist of tongues 66, tips 68a are rotated in a manner such that only their trailing end portions, as viewed in the rotating direction, are in contact with the outer peripheral surface of stalk S.

Figure 6:
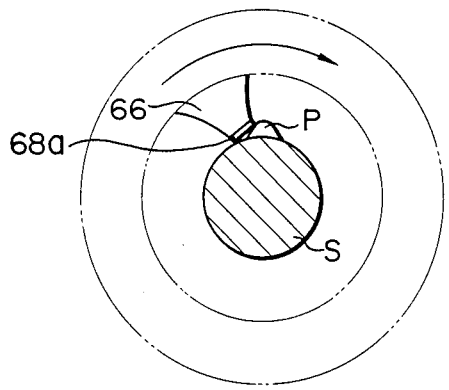
Figure 7:
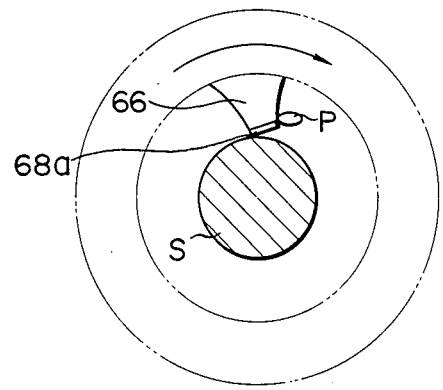

If tobacco plant T is further inserted into leaf picking unit 32, thereafter, leaf picking tips 68a of leaf picking disk 56 move relatively to stalk S of plant T in the axial direction thereof, leaving spiral trajectory X on the outer peripheral surface of the stalk. Thereupon, one of tips 68a first engages proximal end P of the stem of leaf L nearest to the base of plant T. In this case, the leading end of tip 68a is kept apart from the surface of stalk S due to the twist of tongue 66, so that tip 68a clears proximal end P of the stem while tongue 66 in elastically deformed, as shown in FIG. 6. The same will occur even if tongue 66 is not twisted, though, thanks to an elastic deformation of tongue 66. When tip 68a then makes one revolution around stalk S of plant T, it is interposed between the stem of leaf L and stalk S. As a result, a neck portion of the stem near proximal end P is caught by the leading end of chip 68a, as shown in FIG. 7, so that leaf L is snatched away from stalk S at a region near end P of its stem. The tobacco leaves are picked off usually in this manner. Some of leaves L may, however, be picked off from stalk S by only having their stem ends P touched by tips 68a.

Figure 5:
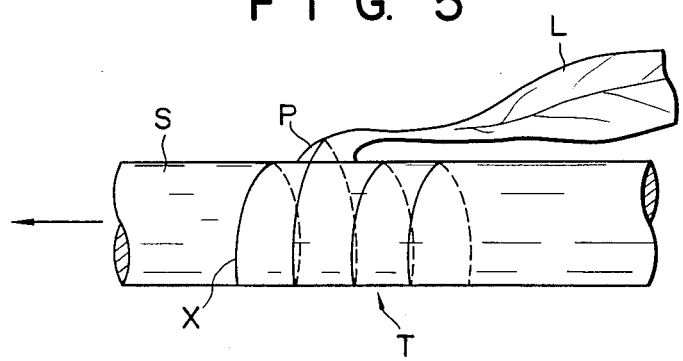
FIGS. 5 to 7 are schematic views for illustrating the leaf picking function of the disk of FIG. 4.

Tobacco leaves L thus separated from stalk S, especially those leaves picked off from the base side of the stalk, as shown in FIGS. 5 to 7, have their stems brought into contact with the curved end portions of auxiliary plate pieces 70. Thus, leaves L are effectively prevented from scattering upward in the radial direction of stalk S. As a result, the separated leaves are dropped all in the same direction to be collected in compartment 148a of collecting vessel 142 which is located right under leaf picking unit 32.

When stalk S of tobacco plant T is inserted to a predetermined depth into leaf picking unit 32, the base of the stalk engages detecting member 108, thereby causing member 108 to rock upward around shaft 106. As a result, switch lever 112 of limit switch 110 also rocks upward, so that switch 110 is turned on. At this point of time, therefore, electromagnetic clutch 172 is worked, so that the driving force of motor 114 is further transmitted to pinion 152 through rotating shaft 164, sprockets 166 and 160, chain 168, and rotating shaft 156. As pinion 152 rotates in this manner, rack 150 or collecting vessel 142 starts to move on rails 136 toward the one end or upper end side thereof.

If stalk S of plant T is manually inserted into leaf picking unit 32 until it is held between toothed rollers 122a and 122b, it is then automatically fed in the direction indicated by an arrow in FIG. 4 by the rotating rollers.

As tobacco plant T is automatically fed in this manner, all leaves L on its stalk S are securely picked off by leaf picking disk 56 rotating as aforesaid. Since tongues 66 of disk 56 are resilient, leaf picking tips 68a rotate always in contact with the outer surface of stalk S of plant T, despite the ruggedness of or the traces of lateral buds on the surface of the stalk, if any. Thus, the aforesaid leaf picking action of tips 68a of disk 56 covers all leaves L, ensuring a reliable leaf picking operation.

Since each tobacco leaf L is securely picked off at the region near proximal end P of its stem by leaf picking disk 56, its blade cannot be damaged by the picking action. Further, leaf L is already separated before its blade reaches disk 56, so that the blade never is caught by disk 56. Thus, the tobacco leaves can be picked off entire and without damage.

All leaves L picked off from stalk S in the aforesaid manner are dropped from leaf picking unit 32 and collected in collecting vessel 142. Meanwhile, vessel 142 is moving on rails 36, as mentioned before, so that the leaves are distributed into compartments 148a to 148d of the vessel. More specifically, in this embodiment, if the traveling speed of vessel 142 is adjusted properly, tobacco leaves L from stalk S of tobacco plant T are assortatively collected in succession into the compartments of vessel 142, the first group of leaves nearest to the base of stalk S into compartment 148a, and the second, third and the last into compartments 148b, 148c and 148d, respectively.

When completely cleared of tobacco leaves L, stalk S is discharged behind toothed rollers 122a and 122b by them. After the top of stalk S has passed through the rear end of moving cylinder 74, detecting member 108 rocks downward by gravity to return to the position shown in FIG. 3, so that limit switch 110 is turned off. As a result, electromagnetic clutch 172 disconnects rotating shaft 164 to the shaft of pulley 174, causing the driving force of motor 114 to cease from being transmitted to the side of vessel 142. Thus, vessel 142 is stopped, when it is restored to its initial position shown in FIG. 1 by gravity.

Thereafter, another tobacco plant T is inserted afresh into leaf picking unit 32, and the aforesaid processes of operation are repeated.

Figure 8:
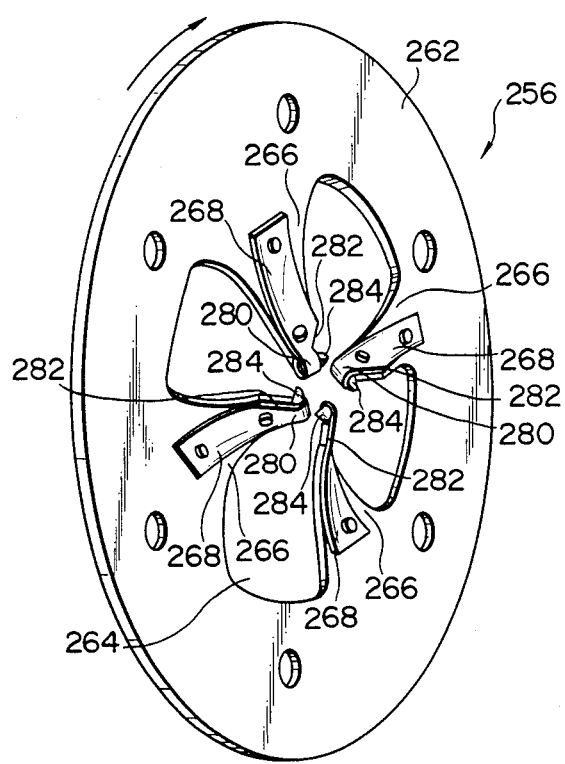
FIG. 8 is a perspective view of another example of the leaf picking disk incorporated in the unit of FIG. 3.
Figure 9:
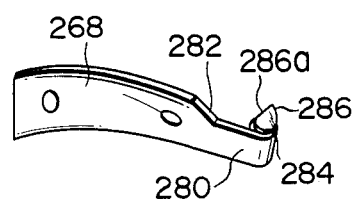
FIG. 9 is a perspective view showing a main plate piece and a leaf picking tip of the disk of FIG. 8.
Figure 10:
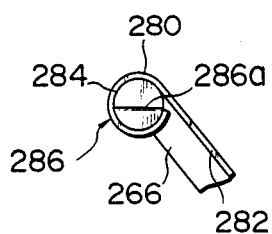
FIG. 10 is a front view of the leaf picking tip fixed to the tip end of a tongue of the disk of FIG. 8.
Figure 11:
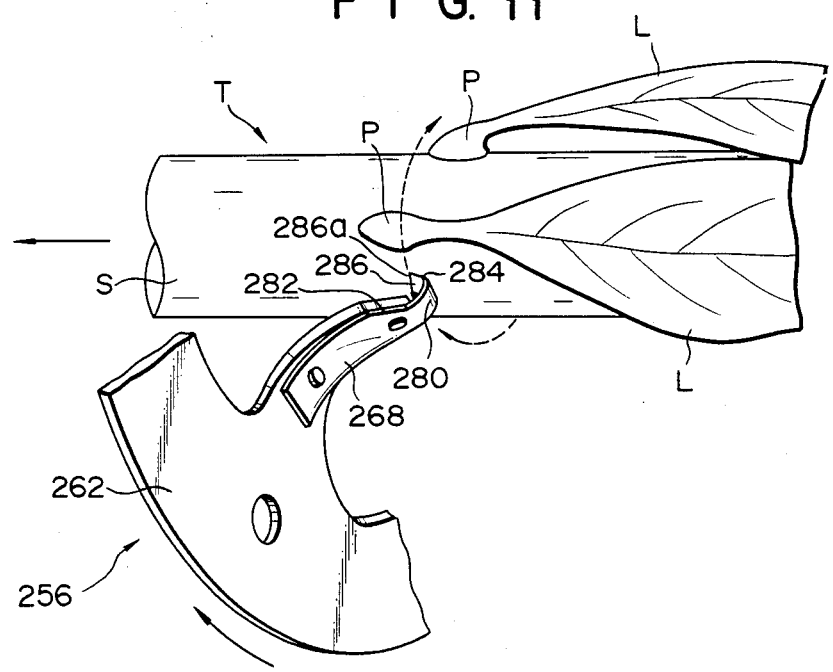
FIG. 11 is a schematic view for illustrating the leaf picking function of the disk of FIG. 8.

The present invention is not limited to leaf picking unit 32 according to the embodiment described above. Referring now to FIGS. 8 to 11, there is shown a modified example of the leaf picking disk. Like disk 56 shown in FIG. 4, leaf picking disk 256 of FIG. 8 includes flexible base 262 which has opening 264 and a plurality of tongues 266. Cutting plate piece 268 as main plate piece is attached to the front face of each tongue 266 of disk 262. Like main or auxiliary plate pieces 68 or 70 shown in FIG. 4, plate pieces 268 have a shape such that tongues 266 are curved and twisted in the aforementioned manner. The distal end portion of each piece 268 is notched on its leading edge, as viewed in the rotating direction of disk 256 indicated by an arrow in FIG. 8, thereby forming slenderized portion 280 projecting from the tip end of its corresponding tongue 266. Thus, slant shoulder 282 is formed between portion 280 and the proximal end portion of cutting plate piece 268, as shown in FIGS. 8 and 9. The distal end portion of each tongue 266 is notched in the same manner as piece 268. Leaf picking tip 284 is attached to portion 280 of each piece 268. The tip, which is a cylindrical member made of tool steel, is inserted in a pipe portion which is formed by bending the end of slenderized portion 280 of each corresponding piece 268. Tip 284 is fixed to portion 280 by crimping the pipe portion. Also, it projects ahead of portion 280 with respect to the rotating direction of leaf picking disk 256. The projecting end of tip 284 constitutes tapered cutting edge portion 286, as shown in FIGS. 9 and 10. As shown in FIGS. 8 and 9, edge 286a of portion 286 is slanted so that a V-shaped hollow is defined between the edge and slant shoulder 282 of cutting plate piece 268.

Leaf picking disk 256 can provide a higher leaf picking function or efficiency than disk 56 can. Even though one of leaf picking tips 284 of disk 256 reaches proximal end P of the stem of tobacco leaf L, edge portion 286 of the tip advances clearing end P, as indicated by broken line in FIG. 11. In this case, as in the case of leaf picking tip 68a of the foregoing embodiment, the leading end of tip 284, i.e., edge 286a of cutting edge portion 286, is kept apart from the outer peripheral surface of stalk S due to the twist of tongue 266. Therefore, edge 286a cannot bite into proximal end P of the stem. When disk 256 further rotates, edge portion 286 of tip 284 is then interposed between stalk S and the stem of leaf L. As edge portion 286 rotates, therefore, the stem is held between the edge and slant shoulder 282 and cut by edge 286a of portion 286. Thus, unlike leaf picking disk 56 of the foregoing embodiment, disk 256 is designed so that the stem of tobacco leaf L is positively cut by means of edge 286a of edge portion 286, ensuring a reliable leaf picking operation. Moreover, leaf picking tip 284 cuts the stems of the leaves by positively catching it in the aforementioned manner, so that the picked leaves are prevented from scattering upward. Therefore, disk 256 does not require the use of such auxiliary plate pieces as are used in the foregoing embodiment.

What is claimed is:

1. A leaf picking apparatus for reaped and dried tobacco plants having a stalk and a number of tobacco leaves connected to the stalk by stems, comprising:
   a leaf picking disk having an axis of rotation and supported for rotation, the disk having a peripheral edge portion, a center opening conentric with the axis and a plurality of flexible tongues spaced circumferentially and extending radially inward from the peripheral edge portion of the opening;
   drive means for rotating the leak picking disk in one rotating direction around the axis of rotation;
   forming means for deflecting inside end portions of said flexible tongues of the leaf picking disk to one side of the disk so that the inside end portions of the tongues spread radially outward, wherein said forming means comprises curved metallic plate pieces, each piece being attached to one side of the tongue and extending along the longitudinal direction of the tongue;
   a plurality of leaf picking elements projecting from the distal ends of the tongues and adapted to rotate, in contact with the outer peripheral surface of the stalks of the tobacco plants, as the leaf picking disk rotates when the plants are passed through the disk from the one side thereof with the base of the stalk of each plant forward; and
   transport means for transporting the tobacco plants in one direction along the axis of rotation.

2. The leaf picking apparatus according to claim 1, wherein the metallic plate pieces are further twisted so that the tongues of the leaf picking disk are twisted in the direction opposite to the rotating direction.

3. The leaf picking apparatus according to claim 2, wherein each plate piece is attached to the forward side of the tongue, as viewed in the transport direction of the tobacco plants, and projects from the distal end of the tongue, and the leaf picking elements include metallic cylindrical tips fixed to the projecting ends of their corresponding plate pieces, each cylindrical tip having an axis across the longitudinal direction of its corresponding tongue and oriented so that its leading end, as viewed in the rotating direction of the leaf picking disk, is located outside its trailing end, with respect to the radial direction of the disk.

4. The leaf picking apparatus according to claim 3, wherein the leaf picking elements further include metallic auxiliary plate pieces attached to the other side of their corresponding tongues and curved and twisted in the same manner as the main plate pieces, each auxiliary plate piece projecting longer from the distal end of its corresponding tongue than the main plate piece does so that the projecting end portion of the auxiliary plate piece is curved outward in the radial direction of the leaf picking disk.

5. The leaf picking apparatus according to claim 2, wherein each plate piece is attached to the rearward side of the tongue, as viewed in the transport direction of the tobacco plants, and projects from the distal end of the tongue, and the leaf picking elements include metallic cylindrical tips fixed to the projecting ends of their corresponding main plate pieces, each cylindrical tip having an axis across the longitudinal direction of its corresponding tongue and oriented so that its leading end, as viewed in the rotating direction of the leaf picking disk, is located outside its trailing end, with respect to the radial direction of the disk.

6. The leaf picking apparatus according to claim 5, wherein a notch portion is formed on the leading side edge, as viewed in the rotating direction of the leaf picking disk, of the distal end portion of each of the plate pieces and the tongues, whereby the cylindrical tips are projected in the rotating direction from their corresponding leading side edges.

7. The leaf picking apparatus according to claim 6, wherein the leading end portion of each cylindrical tip forms a cutting edge portion having an edge slanted so as to face the notch portion side.

8. The leaf picking apparatus according to claim 1, wherein the whole leaf picking disk is made of flexible material.

9. The leaf picking apparatus according to claim 8, wherein the leaf picking disk is made of polyurethane rubber, natural rubber or duck inserted rubber sheet.

10. The leaf picking apparatus according to claim 1, wherein transport means includes a pair of feed rollers and driving means for rotating one of the rollers, the rollers being located ahead of the leaf picking disk, as viewed in the transport direction of the tobacco plants, and spaced so that the stalks of the plants can pass between the rollers, each roller extending at right angles to the transport direction and having, on the outer peripheral surface thereof, a number of teeth capable of biting into the stalks.

11. The leaf picking apparatus according to claim 1, further comprising a hollow pushing cylinder through which the tobacco plants can pass and means for reciprocating the pushing cylinder along the axis of rotation, the pushing cylinder being located ahead of the leaf picking disk, as viewed in the transport direction of the plants, and concentric with the axis of rotation, and having a diameter large enough to engage the tongues of the disk.

12. A leaf picking apparatus for reaped and dried tobacco plants having a stalk and a number of tobacco leaves connected to the stalk by stems, comprising:
   a leak picking disk having an axis of rotation and supported for rotation, the disk having a peripheral edge portion, a center opening concentric with the axis and a plurality of flexible tongues spaced circumferentially and extending radially inward from the peripheral edge portion of the opening, wherein said disk is made of elastic material;
   drive means for rotating the leaf picking disk in one rotating direction around the axis of rotation;
   forming means for deflecting inside end portions of said flexible tongues of the leak picking disk to one side of the disk so that the inside end portions of the tongues spread radially outward;
   a plurality of leaf picking elements projecting from the distal ends of the tongues and adapted to rotate, in contact with the outer peripheral surface of the stalks of the tobacco plants, as the leaf picking disk rotates when the plants are passed through the disk from the one side thereof with the base of the stalk of each ploant forward; and
   transport means for transporting the tobacco plants in one direction along the axis of rotation.

13. A leak picking apparatus for reaped and dried tobacco plants having a stalk and a number of tobacco leaves connected to the stalk by stems, comprising:
- a leaf picking disk having an axis of rotation and supported for rotation, the disk having a peripheral edge portion, a center opening concentric with the axis and a plurality of flexible tongues spaced circumferentially and extending radially inward from the peripheral edge portion of the opening;
- drive means for rotating the leaf picking disk in one rotating direction around the axis of rotation;
- forming means for deflecting inside end portions of said flexible tongues of the leaf picking disk to one side of the disk so that the inside end portions of the tongues spread radially outward;
- a plurality of leaf picking elements projecting from the distal ends of the tongues and adapted to rotate, in contact with the outer peripheral surface of the stalks of the tobacco plants, as the leaf picking disk rotates when the plants are passed through the disk from the one side thereof with the base of the stalk of each plant forward; and
- transport means for transporting the tobacco plants in one direction along the axis of rotation, comprising a plurality of feed rollers and driving means for rotating one of the rollers, the rollers being located ahead of the leaf picking disk, as viewed in the transport direction of the tobacco plants; and spaced so that the stalks of the plants can pass between the rollers, each roller extending at right angles to the transport direction and having, on the outer peripheral surface thereof, a number of teeth capable of biting into the stalks.

14. A leaf picking apparatus for reaped and dried tobacco plants having a stalk and a number of tobacco leaves connected to the stalk by stems, comprising:
- a leaf picking disk having an axis of rotation and supported for rotation, the disk having a peripheral edge portion, a center opening concentric with the axis and a plurality of flexible tongues spaced circumferentially and extending radially inward from the peripheral edge portion of the opening;
- drive means for rotating the leaf picking disk in one rotating direction around the axis of rotation;
- forming means for deflecting inside end portions of said flexible tongues of the leaf picking disk to one side of the disk so that the inside end portions of the tongues spread radially outward;
- a plurality of leaf picking elements projecting form the distal ends of the tongues and adapted to rotate, in contact with the outer peripheral surface of the stalks of the tobacco plants, as the leaf picking disk rotates when the plants are passed through the disk from the one side thereof with the base of the stalk of each plant forward;
- transport means for transporting the tobacco plants in one direction along the axis of rotation; and
- a hollow pushing cylinder through which the tobacco plants can pass and means for reciprocating the pushing cylinder along the axis of rotation, the pushing cylinder being located ahead of the leaf picking disk, as viewed in the transport direction of the plants, and concentric with the axis of rotation, and having a diameter large enough to engage the tongues of the disk.

* * * * *